T. WARKER.
APPARATUS FOR DRAWING EFFERVESCENT LIQUIDS.
No. 7,113. Reissued May 16, 1876.
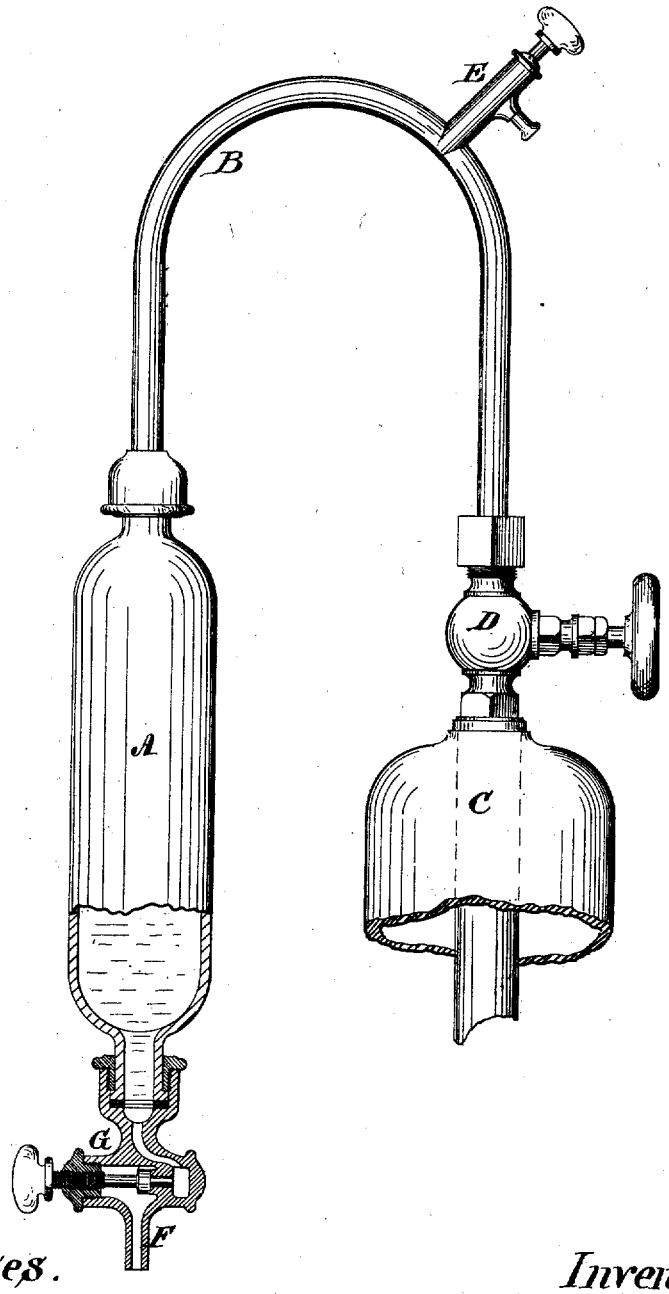
Witnesses.
S. P. Hollingsworth.
Blanchard
Inventor.
Thomas Warker
per Henry E. Roeder
attorney.
N. PETERS, PHOTO-LITHOGRAPHER, WASHINGTON, D. C.

UNITED STATES PATENT OFFICE.

THOMAS WARKER, OF NEW YORK, N. Y.

IMPROVEMENT IN APPARATUS FOR DRAWING EFFERVESCENT LIQUIDS.

Specification forming part of Letters Patent No. 144,809, dated November 18, 1873; reissue No. 7,113, dated May 16, 1876; application filed April 12, 1876.

*To all whom it may concern:*

Be it known that I, THOMAS WARKER, of New York, in the State of New York, have invented a new and Improved Apparatus for Drawing Effervescent Liquids, of which the following is a specification, reference being had to the accompanying drawing, which represents a side view of my apparatus, partially in section.

This invention consists in the arrangement of a pressure-relieving chamber between the vessel or fountain from which the effervescent liquid is to be drawn and the vessel which is to receive the liquid so drawn; and, further, in the arrangement of three valves, one of which controls the communication between the liquid-containing vessel and the pressure-relieving chamber, while the second serves to let off the surplus gas from the relieving-chamber, and the third serves to draw the liquid from said chamber into a tumbler or other vessel intended to receive the same.

By this arrangement the liquid to be drawn is first led into the pressure-relieving chamber, from which the free or surplus gas can be let off, when the liquid from said relieving-chamber can be drawn without being subject to any pressure, and will flow out at the discharge-spout into the tumbler or other receiving-vessel by its own gravity, whereby the liquid thus drawn preserves its effervescence, as all frothing or foaming will thereby be prevented.

A designates the pressure-relieving chamber, which is connected by a pipe, B, with a vessel or reservoir, C, that contains an effervescent liquid—such, for instance, as champagne, soda-water, or other fluid charged with gas. In this pipe B is a stop-cock, D, which controls the communication between the vessel C and the relieving-chamber A, and a valve, E, is provided to let off any pressure or free gas that may exist in the relieving-chamber. This valve E may be arranged at any convenient place between the vessel C and the relieving-chamber A, and it may be connected with the stop-cock D, so that it opens when said stop-cock is closed, and vice versa. On the bottom end of the relieving-chamber A a discharge-spout, F, is secured, which can be opened or closed by a stop-cock or valve, G, and this valve may be so arranged that it can be opened by hand, or that it opens and closes automatically, according to the position given to the relieving-chamber. The pipe B is provided with a coupling or other suitable device, so that the same can be conveniently secured to the mouth of a champagne-bottle, or to any other vessel containing an effervescent liquid.

If a portion of this liquid is to be drawn into a tumbler or other receiver, the valves E and G are closed, and the stop-cock D is opened, whereby the relieving-chamber A is filled to any desired point. To effect this purpose the vessel C must either be turned up, or the pipe B must be so arranged that it extends down into said vessel close to its bottom, by which latter arrangement the pressure on the top of the liquid in the vessel C will force said liquid into the chamber A. After the relieving-chamber A has been filled to the desired point, the stop-cock D is closed, and by opening the valve E the free gas in the top of the chamber A will escape, and the liquid in said chamber is relieved from all pressure, and by opening the valve G such liquid discharges by its inherent gravity, without producing any foaming or frothing, as the discharge of the free gas leaves the liquid without agitation, thereby preventing the same from losing its life or effervescence.

If the effervescent liquid is discharged from the vessel C under the pressure due to the free gas collected in said vessel above the liquid, the force of the discharge will produce frothing and foaming, whereby the gas mixed with the effervescent liquid will more readily escape by the force of this violent agitation during the discharge, and the liquid in the tumbler has lost its life. By my arrangement of this intermediate chamber A the free gas collected in the top of said chamber A is first allowed to escape, when the liquid discharges itself by its inherent gravity, retaining a large portion of the gas with which it has been charged, and thus retaining its life or effervescence in the tumbler.

What I claim as new, and desire to secure by Letters Patent, is—

1. The combination of a vessel or fountain, C, containing effervescent liquid, and a pressure-relieving chamber, A, provided with a discharge-spout, F, and having a gas-escape valve, E, connected with its upper end, said chamber A being situated between the vessel C and the discharge-spout F, so arranged that the liquid will flow out of the chamber A by its inherent gravity, in the manner and for the purpose substantially as described.

2. The described combination of the pressure-relieving chamber A, having a discharge-spout, F, the gas-escape valve E, and the pipe B, having a stop-valve, D, and adapted to a vessel containing effervescent liquid, in the manner and for the purpose specified.

THOMAS WARKER.

Witnesses:

J. B. NONES,

HENRY E. ROEDER.